United States Patent
Mottet et al.

(10) Patent No.: US 11,571,659 B2
(45) Date of Patent: Feb. 7, 2023

(54) DEVICE FOR PRODUCING ENERGY BY SALINITY GRADIENT THROUGH TITANIUM OXIDE NANOFLUID MEMBRANES

(71) Applicants: Centre National de la Recherche Scientifique (CNRS), Paris (FR); Sweetch Energy, Lorient (FR)

(72) Inventors: Bruno Mottet, Guidel (FR); Lyderic Bocquet, Paris (FR); Alessandro Siria, Paris (FR); Mikhael Bechelany, Montpellier (FR)

(73) Assignees: Centre National de la Recherche Scientifique (CNRS), Paris (FR); Sweetch Energy, Rennes (FR)

( * ) Notice: Subject to any disclaimer, the term of this patent is extended or adjusted under 35 U.S.C. 154(b) by 32 days.

(21) Appl. No.: 17/184,333

(22) Filed: Feb. 24, 2021

(65) Prior Publication Data
US 2021/0178326 A1    Jun. 17, 2021

Related U.S. Application Data

(62) Division of application No. 15/756,693, filed as application No. PCT/EP2016/070683 on Sep. 2, 2016, now Pat. No. 10,960,354.

(30) Foreign Application Priority Data

Sep. 2, 2015    (EP) .................................... 15306346

(51) Int. Cl.
*B01D 61/00*    (2006.01)
*B01D 67/00*    (2006.01)
(Continued)

(52) U.S. Cl.
CPC ....... *B01D 61/002* (2013.01); *B01D 67/0065* (2013.01); *B01D 71/024* (2013.01);
(Continued)

(58) Field of Classification Search
None
See application file for complete search history.

(56) References Cited

U.S. PATENT DOCUMENTS 3,906,250 A    9/1975  Loeb
4,193,267 A    3/1980  Loeb
(Continued)

FOREIGN PATENT DOCUMENTS

WO    2014/060690 A1    4/2014

OTHER PUBLICATIONS

Alessandro Siria, et al: Giant osmotic energy conversion in a single transmembrane boron nitride nanotube—Nature—vol. 494—p .455-458.
(Continued)

*Primary Examiner* — Carmen V Lyles-Irving
(74) *Attorney, Agent, or Firm* — Banner & Witcoff, Ltd.

(57) ABSTRACT

A method for producing electrical energy. An electrolyte solution having a first concentration $C_A$ of a solute is placed in a first vessel having an electrode arranged so the electrode is contacted with the electrolyte solution of concentration $C_A$. An electrolyte solution having a concentration $C_B$ of the same solute is placed in a second vessel having an electrode arranged so the electrode comes in contact with the electrolyte solution of concentration $C_B$, the concentration $C_B$ being lower than the concentration $C_A$. The first and the second vessels are separated by a membrane, the membrane having at least one nanochannel arranged to allow diffusion of the electrolyte solution from the first vessel to the second vessel through the at least one nanochannel. An inner surface of the
(Continued)

at least one nanochannel is formed of at least one titanium oxide. Electrical energy generated by a potential difference existing between the electrodes is captured using a device having the first and second vessels.

20 Claims, 2 Drawing Sheets

(51) Int. Cl.
    *B01D 71/02*     (2006.01)
    *F03G 7/00*     (2006.01)
    *H01M 8/22*     (2006.01)

(52) U.S. Cl.
    CPC ............ *F03G 7/005* (2013.01); *H01M 8/227* (2013.01); *Y02E 10/30* (2013.01); *Y02P 70/50* (2015.11)

(56) References Cited

U.S. PATENT DOCUMENTS

| | | |
|---|---|---|
| 2006/0063052 A1 | 3/2006 | Hu et al. |
| 2012/0094192 A1 | 4/2012 | Qu et al. |
| 2013/0105386 A1 | 5/2013 | Deville et al. |

OTHER PUBLICATIONS

Bechelany et al.: "Synthesis of Boron Nitride Nanotubes by a Template-Assisted Polymer Thermolysis Process" J. Phys. Chem. C 2007, 111, 13378-13384.

Guohua Lin,, et al: Progress on free-standing and flow-through TiO2 nanotubes membranes, Solar Energy Materials & Solar Cells, 98, 2012, pp. 24-38.

Poulomi Roy, et al: "TiO2 nanotubes synthesis and applications", Angewandte Chemistry Int. Ed., 50, 2011, pp. 2904-2939.

Jung Tae Park, Won Seok Chi, Sang Jin Kim, Daeyeon Lee & Jong Hak Kim, Scientific Reports 4 :5505, Nature, 2014.

Kang, Beyeong Dong, et al. "Numerical study on energy harvesting from concentration gradient by reverse electrodialysis in anodic alumina nanopores" (Energy vol. 86, May 16, 2015, pp. 525-538, ISSN: 0360-5442.

Keh H J et al.:"The Effect of diffusioosmosis on water transport in polymer electrolyte fuel cells", Journal of Power Sources, Elsevier SA, CH, vol. 180, No. 2, Mar. 2, 2008 (Mar. 2, 2008), pp. 711-718, XP022633172, ISSN: 0378-7753, DOI: 10.1016/J.

Sep. 12, 2016—International Search Report and Written Opinion of PCT/EP2016/070683.

Picallo et al, Physical review letters, 111, 244501-5 (2013).

DEVICE FOR PRODUCING ENERGY BY SALINITY GRADIENT THROUGH TITANIUM OXIDE NANOFLUID MEMBRANES

CROSS-REFERENCE TO RELATED APPLICATION

This application is a divisional of U.S. application Ser. No. 15/756,693, filed Mar. 1, 2018, which is a U.S. National Stage application under 35 U.S.C. § 371 of International Application PCT/EP2016/070683 (published as WO 2017/037213 A1), filed Sep. 2, 2016, which claims priority to EP 15306346.6, filed on Sep. 2, 2015, each of these applications being incorporated herein in its entirety.

TECHNICAL FIELD

The subject of the invention is a device for producing electrical energy via salinity gradient through a titanium oxide nanofluid membrane. A further subject of the invention is a method for producing energy using said device.

PRIOR ART

The production of salinity gradient energy is one of the renewable energy sources having the greatest potential on planetary scale.

Four different technologies are currently envisaged to harvest this "blue" energy: Pressure Retarded Osmosis (PRO), Reverse Electrodialysis (RED), capacitive systems (Capmix) and use of boron nitride nanoporous membranes.

Pressure Retarded Osmosis (PRO), such as described in U.S. Pat. Nos. 3,906,250 and 4,193,267, uses so-called semi-permeable membranes allowing the selective passing of water molecules to generate osmotic overpressure on the side of the solution with the highest concentration of salt. This overpressure allows the mechanical driving of a hydro-turbine via the flow thus generated, to produce electricity. Energy production is indirectly related to the salinity gradient, since it is obtained mechanically through a hydro-turbine.

The membranes used for PRO are specific, so-called semi-permeable membranes. These membranes only allow the passing of water molecules without allowing the passing of ions derived from the dissolved salts. To enable this selectivity, they necessarily have controlled porosity with pore diameters in the order of a few angstroms and are generally organic membranes made of polyamide derivatives or cellulose acetate. Despite numerous studies and much research on the optimisation of these PRO-dedicated membranes, their low permeability, sensitivity to fouling and energy losses related to the mechanical operating of turbines limit energy production to a few watts par m$^2$ of membrane. At the present time, the cost of these membranes in relation to the amount of energy produced has slowed the development of this technology.

Reverse electrodialysis is an electrochemical route based on the Donnan potential across so-called "permselective"+ ion exchange membranes. The device is formed of alternating cells with circulation of the solution having the highest electrolyte concentration and the solution with the least concentration. These cells are alternately separated by anion exchange membranes and cation exchange membranes. Electrodes are positioned at the end of these stacks of cells, and harvest the electric current generated by the global ion flow. However, the fouling of membranes, the accumulation of charges on the surface of these membranes, their low permeability and need for regeneration thereof penalise the overall economic balance of this technology. The production of energy in relation to membrane surface area does not exceed a few watts par m$^2$.

A second electrochemical route based on alternating charging and discharging in capacitive systems (Capmix system) is also the subject of research. It appears that the optimisation of capacitive membranes still remains a difficulty for this electrochemical method.

Recently, a new route for producing energy via salinity gradient using nanoporous membranes made of compounds of boron nitride type or more generally carbon, boron or nitrogen compounds, has been discovered by Siria et al. (Giant osmotic energy conversion in a single transmembrane boron nitride nanotube—Nature—volume 494—p. 455-458) (WO 2014/060690). This route applies phenomena of diffusion-osmosis and allows the production of large amounts of energy per membrane surface area (in the order kW/m$^2$). However, this method requires the production of boron nitride membranes deposited on nanoporous alumina substrates. Said membranes have never been synthesised beyond laboratory scale (Synthesis of Boron Nitride Nanotubes by a Template-Assisted Polymer Thermolysis Process, Bechelany et al., J. Phys. Chem. C 2007, 111, 13378-13384). Their development on a larger scale appears to be most complex and extremely costly having regard to the necessary materials.

In the light of the foregoing, there is therefore a need for a method to produce electrical energy that is non-polluting, easy to implement, relatively economical and allows energy production to be obtained per square metre of membrane in the order of kW/m$^2$. In particular, there is a need for a device allowing the production of electric energy via salinity gradient that does not have the shortcomings, defects, limitations and disadvantages of prior art methods for producing salinity gradient electrical energy, particularly regarding the industrialisation and production cost of these membranes.

The present invention proposes providing an efficient solution for producing salinity gradient electrical energy in terms of energy power obtained and membrane production cost.

SUMMARY OF THE INVENTION

In the present invention, the inventors have discovered that the use of a membrane comprising nanochannels, having at least part of their inner surface essentially formed of at least one titanium oxide, in a device for producing energy via salinity gradient allows the obtaining of energy production per square metre of membrane in the order of kW/m$^2$, whilst reducing the production cost of the membranes. In addition, the use of said membranes also allows facilitated larger-scale development of a device for producing salinity gradient energy and a reduction in the cost thereof.

In a first aspect, the present invention therefore concerns a device for producing electrical energy comprising:
  a. a first vessel A (20A) intended to receive an electrolyte solution having a concentration $C_A$ of a solute (22A) and comprising an electrode (30A) arranged so that it comes in contact with electrolyte solution of concentration $C_A$;
  b. a second vessel B (20B) intended to receive an electrolyte solution having a concentration $C_B$ of the same solute (22B), $C_B$ being lower than $C_A$, and comprising an electrode (30B) arranged so that it comes in contact with the electrolyte solution of concentration $C_B$;

c. a membrane (10) separating the two vessels, said membrane comprising at least one nanochannel (11) arranged to allow diffusion of the electrolytes from vessel A towards vessel B through said nanochannel(s); and d. a device (32) allowing providing of the electrical energy generated by the potential difference existing between the two electrodes, characterized in that at least part of the inner surface of the nanochannel(s) is essentially formed of at least one titanium oxide.

The invention further concerns a method for producing electrical energy using a device such as described above, comprising the following steps:

i. providing a device to produce electrical energy applying the following steps:

placing said electrolyte solution having a concentration $C_A$ of solute (22A) in vessel A (20A), so that the electrode (30A) with which it is equipped is in contact with said solution (22A), placing said electrolyte solution having a concentration $C_B$ of the same solute (22B), $C_B$ being lower than $C_A$, in vessel B (20B), so that the electrode with which it is equipped is in contact with said solution (22B), and separating the two vessels A and B by said membrane (10) comprising at least one nanochannel (11) arranged to allow diffusion of the electrolytes from vessel A towards vessel B through said nanochannel(s);

ii. capturing the electrical energy generated by the potential difference existing between the two electrodes, using the device (32).

Each vessel A and B may be any device or natural environment, open or closed, able to contain a liquid.

To generate a flow via diffusion-osmosis, the concentrations $C_A$ and $C_B$ of one same solute in the electrolyte solutions 22A and 22B are necessarily different. In the present invention, it is arbitrarily considered that $C_B$ is lower than $C_A$, which leads to circulation of the ions of the solute from vessel A towards vessel B.

The membrane 10, a so-called "nanofluid" membrane, separating the two vessels A and B, comprises at least one nanochannel 11 arranged to allow diffusion of the electrolytes from one vessel to the other through the said nanochannel(s). In the present invention, diffusion occurs from vessel A towards vessel B. The said nanochannel(s) 11 have a mean cross-section allowing both the water molecules and the ions of the solute to circulate. In addition, the morphology of these nanochannels promotes good diffusion of the solution through the membrane. In the present invention, at least part of the inner surface of the nanochannel(s) is essentially formed of at least one titanium oxide ($TiO_2$).

The electrodes 30A and 30B may be partly or fully immersed in the solutions 22A and 22B. It is also possible to provide that the electrodes are in the form of at least one portion of a wall of the vessels.

The device (32) allows capturing and providing the electrical energy spontaneously generated by the potential difference existing between the two electrodes 30A and 30B. It may be formed of mere cables connecting a battery, a bulb or any other form of electricity consumption.

Figure 2:
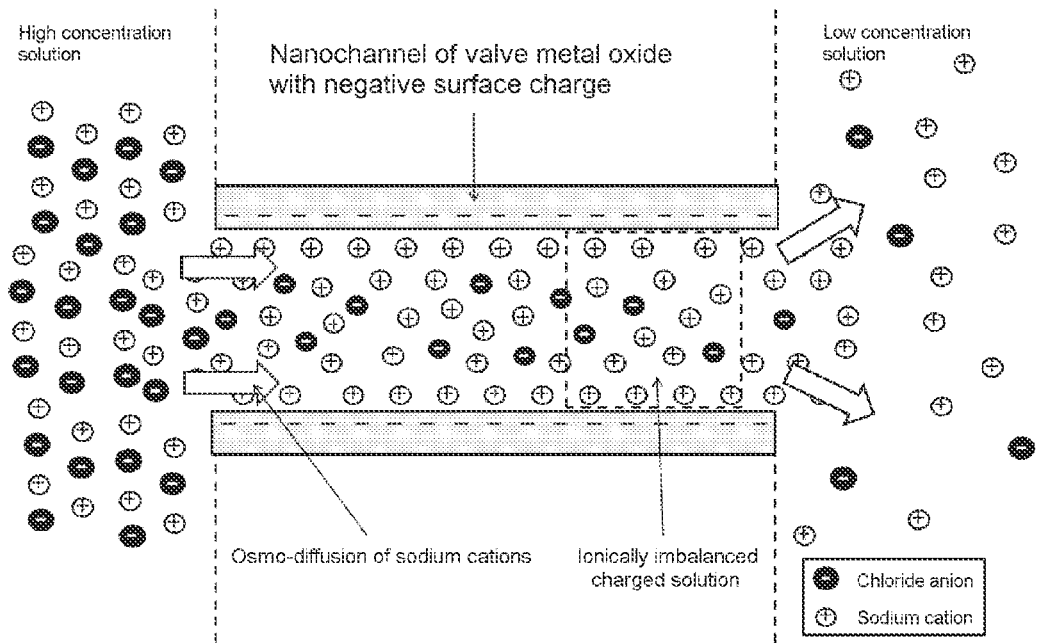

FIG. 2 illustrates the phenomenon of diffusion-osmosis of a NaCl solution on the scale of a nanochannel negatively charged on the surface and generating an ionically imbalanced flow under the influence of the surface charge of the materials causing the electric current.

Figure 3:
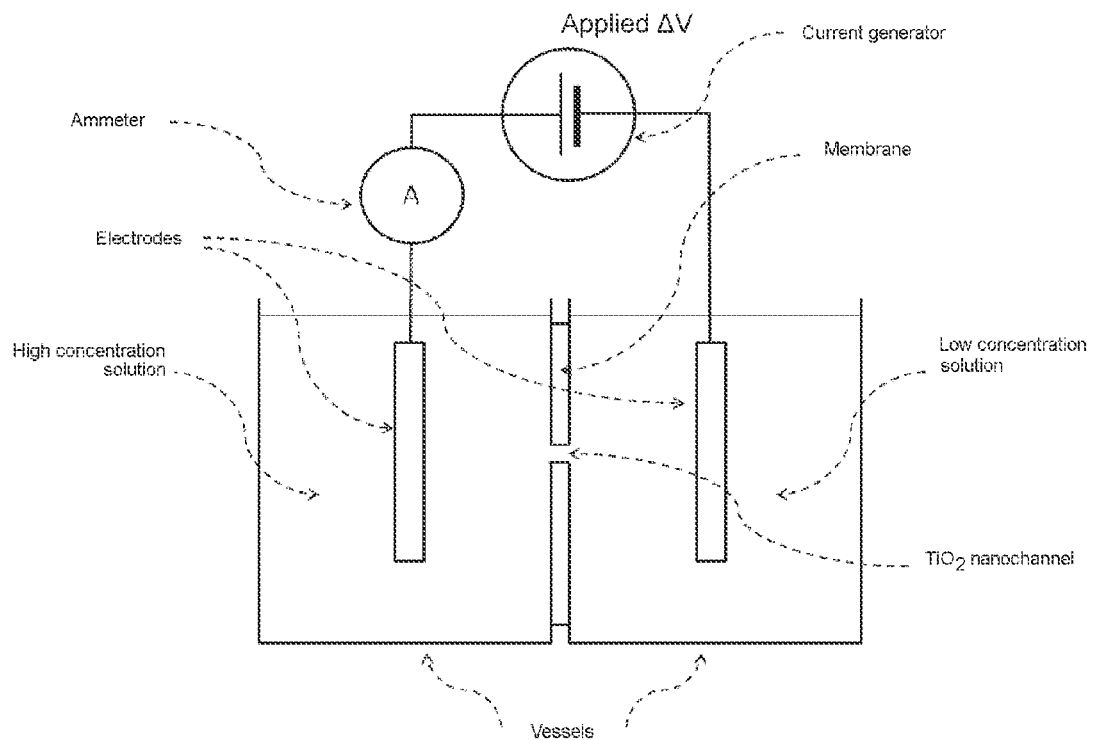

FIG. 3 illustrates the device of Examples 1 and 2 allowing measurement of the electric current and electric power generated per $m^2$ of a nanofluid membrane comprising a nanochannel having an inner surface in $TiO_2$.

DETAILED DESCRIPTION OF THE INVENTION

The present invention concerns a device for producing electrical energy via salinity gradient comprising:

a. a first vessel A (20A) intended to receive an electrolyte solution having a concentration $C_A$ of a solute (22A) and comprising an electrode (30A) arranged so that it comes in contact with the electrolyte solution of concentration $C_A$;

b. a second vessel B (20B) intended to receive an electrolyte solution having a concentration $C_B$ of the same solute (22B), $C_B$ being lower than $C_A$, and comprising an electrode (30B) arranged so that it comes in contact with the electrolyte solution of concentration $C_B$;

c. a membrane (10) separating the two vessels, said membrane comprising at least one nanochannel (11) arranged to allow diffusion of the electrolytes from vessel A towards vessel B through said nanochannel(s); and d. a device (32) allowing providing of the electrical energy generated by the potential difference existing between the two electrodes, characterized in that at least part of the inner surface of the nanochannel(s) is essentially formed of at least one titanium oxide.

Figure 1:
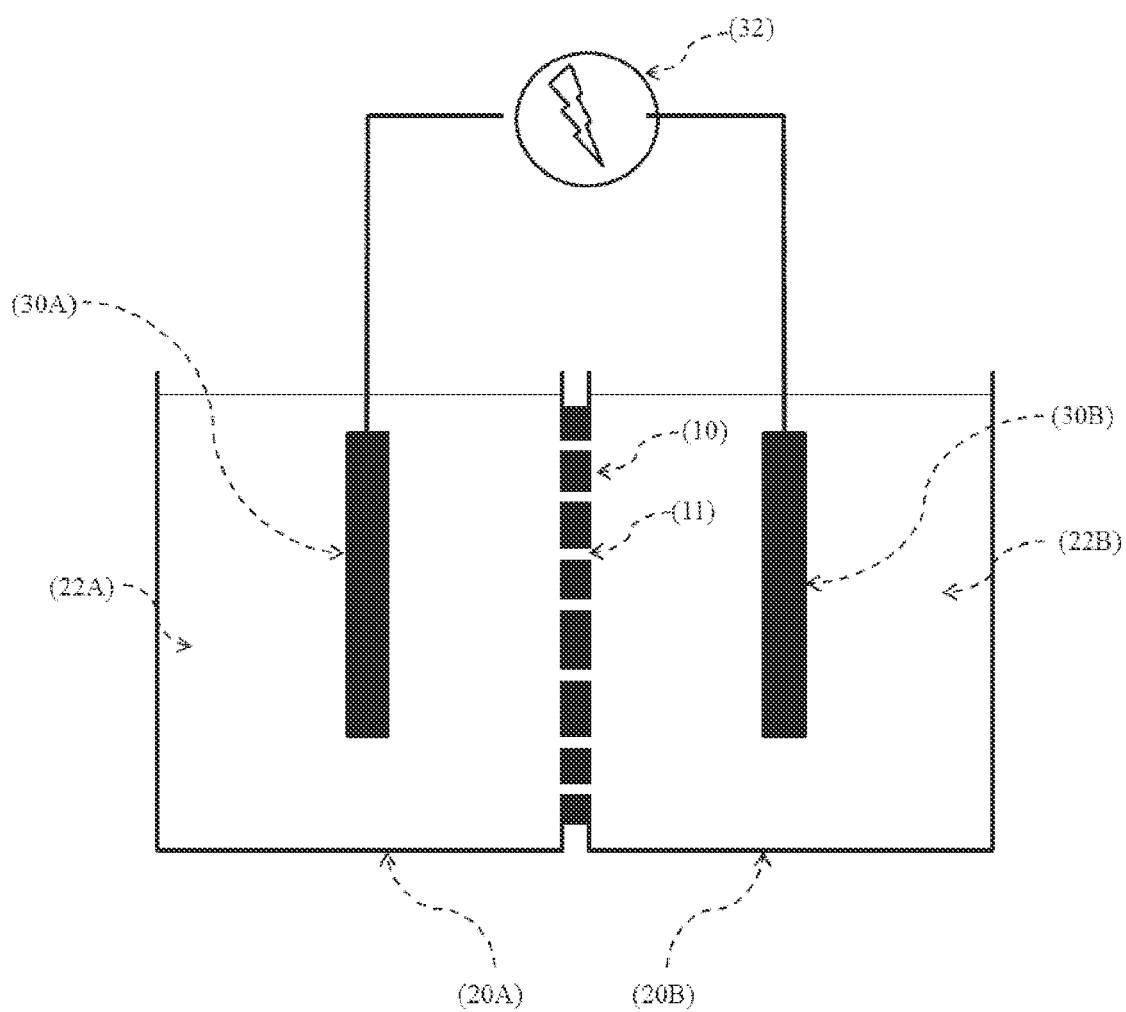
FIG. 1 schematically illustrates an example of a device for producing electrical energy according to the present invention comprising two vessels 20A and 20B, respectively vessel A and vessel B, separated by a membrane 10. Each of the two vessels contains an electrolyte solution 22A and 22B having a respective concentration $C_A$ and $C_B$ of one same solute, an electrode 30A and 30B being immersed therein. The two electrodes 30A and 30B are connected to a device allowing the capture and providing of the generated electrical energy.

This device is described in more detail below and in the description of FIG. 1.

In the device of the invention, electrical energy is generated by means of the difference in the concentrations $C_A$ and $C_B$ of one same solute in the electrolyte solutions causing mobility of the electrolytes via diffusion-osmosis from the most concentrated solution towards the least concentrated solution through the nanochannels of the membrane and under the influence of their surface properties.

Therefore, one of the key points of the present invention lies in the type, the morphology and the density of the nanochannels in the membrane of the invention, in particular the inner wall of said nanochannels.

First, the choice of material forming the inner wall of the nanochannels is crucial since, depending on the type of material and the surface charge thereof in an aqueous medium, the generated energy will be of greater or lesser quantity. Depending on the type of material of the inner wall of the nanochannels, the electrolyte solution moving from one vessel to the other will effectively be electrically charged to a greater or lesser extent, since it is ionically imbalanced under the influence of the surface charge of the material. The more the electrolyte solution moving from one vessel to the other is ionically imbalanced, the greater the difference in concentration between the two vessels and the higher the production of energy.

In the present invention, the inventors have discovered that the nanochannels having an inner wall essentially formed of titanium oxide generate very strong ionic imbalance in the electrolyte solution circulating between the two vessels, and therefore generate particularly high electrical energy between the two electrodes.

By titanium oxide is meant any type of metal titanium oxide, namely titanium (II) oxide of formula TiO and the corresponding non-stoichiometric forms of compositions between $TiO_{0.7}$ and $TiO_{1.3}$, titanium (IV) oxide or titanium dioxide, and the mixtures thereof. These titanium oxides may be in different solid polymorphous forms, in particular in amorphous form or in crystalline form. In respect of titanium dioxide ($TiO_2$), the rutile or anatase crystalline form type is chiefly used, the anatase form being preferred howeer.

By at least part of the inner surface of the nanochannels, in the meaning of the present invention, is meant that the inner surface of the nanochannels may comprise one or more sections essentially formed of a titanium oxide, or that the entirety of the inner surface is essentially formed of at least one titanium oxide. Said section(s) may be regular or irregular, intermittent or non-intermittent and/or in the form of a single layer or multi-layers. Preferably, the total inner surface of the nanochannels is essentially formed of at least one titanium oxide.

By "essentially formed of titanium oxide", in the meaning of the present invention, it is meant formed of titanium oxide and minority element(s) such as impurities.

Without wishing to be bound by any theory, the inventors are of the opinion that the nanochannels of titanium oxide, in particular of titanium oxide, having regard to their type, size and physicochemical properties, in particular their surface charge density in the order of 0.1 to 1 $C/cm^2$, promote the passing of ions having opposite charges to their surface charge via a nanofluid phenomenon of diffusion-osmosis generated by the salinity gradient. FIG. 2, in longitudinal section, illustrates the phenomenon of diffusion-osmosis on the scale of a nanochannel. In particular, it shows the differentiated movement of $Na^+$ cations and $Cl^-$ anions from a concentrated NaCl solution towards a diluted NaCl solution on the negatively charged surface of a nanochannel in $TiO_2$. Without being absolutely selective however in respect of ions or water molecules in comparison with prior art membranes in particular PRO and RED membranes, the membrane of the invention creates an ion flow that is globally electrically charged since it contains anion and cation imbalance under the effect of the surface charges.

In one preferred embodiment, at least part of the inner surface of the nanochannels is essentially formed of a titanium oxide, in particular in the form of $TiO_2$.

Advantageously, the nanochannels are entirely formed of titanium oxide.

The physicochemical properties of titanium oxide can generally be modulated and amplified by doping or functionalisation i.e. by inserting metallic chemical elements on the surface or in the core of the titanium network, such as iron, silver, vanadium, gold, platinum, niobium, tungsten, or non-metallic elements such as nitrogen, sulfur, carbon, hydrogen, boron, phosphorus, or different chemical compounds of the silane, amine or other organic families, preferably in small amounts e.g. in the order of a few weight percent.

In one preferred embodiment of the invention, the titanium oxide is doped on the surface or in the core of its crystalline network by inserting metallic chemical elements such as iron, silver, vanadium, gold, platinum, niobium, tungsten, or non-metallic elements such as nitrogen, sulfur, carbon, hydrogen, boron, phosphorus, or different chemical compounds such as silanes or amines, preferably in an amount of between 0.5 and 10 weight % and more preferably between 1 and 5 weight %.

The choice of material forming the inner wall of the nanochannels also has an influence on the industrialisation of the membranes of the invention. Indeed, the membranes comprising titanium nanochannels are relatively easy to produce and at low cost, in comparison with boron nitride membranes or carbon, boron or nitrogen membranes described in the prior art. A membrane comprising nanochannels having an inner surface essentially formed of titanium oxide can be obtained directly by anodizing titanium foil (cf. Progress on free-standing and flow-through $TiO_2$ nanotubes membranes, Guohua Lin, Kaiying Wang, Nils Hoivik, Henrik Jakobsen, Solar Energy Materials & Solar Cells, 98, 2012, pp 24-38; TiO2 nanotubes synthesis and applications, Poulomi Roy, Steffen Berger, Patrick Schmuki, Angewandte Chemistry Int. Ed., 50, 2011, pp 2904-2939). Other techniques such as sol-gel techniques in the presence of block copolymers or grafted copolymers also allow the synthesis of $TiO_2$ membranes with regular, oriented nanochannels (cf. Jung Tae Park, Won Seok Chi, Sang Jin Kim, Daeyeon Lee & Jong Hak Kim, *Scientific Reports* 4:5505, Nature, 2014). With this method, it is also possible to modulate the morphological parameters, length, width and asymmetry of through nanochannels. In addition, powder and sintering technology can be used to obtain very thin titanium oxide membranes having regular, controlled through nanochannels. Said membranes can also be obtained with different $TiO_2$ deposit techniques via CVD (Chemical Vapour Deposit), ALD (Atomic Layer Deposition) or HiP-IMS (High Power Impulse Magnetron Sputtering), e.g. on nanoporous substrates having preformed morphology.

Said membranes can also be carried by a nanoporous or pierced mechanical substrate on which the titanium is deposited. For example, said membranes may be composed of a flexible polymer membrane on which a layer of $TiO_2$ is deposited.

Additionally, the morphology of the nanochannels has an influence on the yield of generated electrical energy. The mean cross-section of the nanochannels and their specific, regular through-morphology promote good diffusion of the solution through the membrane. Therefore, the membrane of the invention sets itself clearly apart from semi-permeable or ion exchange membranes in the prior art, via its nanochannels that potentially allow the circulation both of water molecules and of ions, since each of the nanochannels has a cross-section larger than the size of these molecules.

Preferably, in the present invention, the mean diameter of the nanochannels is between 1 and 500 nm, in particular between 10 and 100 nm.

By "mean diameter" in the meaning of the present invention is meant the inner mean diameter of a nanochannel. The nanochannel may have nanotubular, conical asymmetric, neck or perforated base morphology. If the nanochannel has nanotubular morphology i.e. of circular cross-section, the mean diameter corresponds to the inner diameter of the circular cross-section. If the nanochannel has conical asymmetric, neck or perforated base morphology, or an oval or irregular cross-section, the mean diameter corresponds to the mean of the smallest and largest inner diameter. The mean diameter of the nanochannels is measured using means known to persons skilled in the art. For example, the mean diameter can be measured by scanning electron microscopy or transmission electron microscopy. Advantageously, the nanochannels contained in the membrane have homogeneous diameters. If, on one same membrane, the nanochannels do not all have homogeneous diameters, the mean diameter will correspond to the mean of the mean diameters of all the nanochannels.

Advantageously, in the present invention, the nanochannels have nanotubular, conical asymmetric, neck or perforated base morphology, preferably said nanochannels have conical asymmetric morphology. If the nanochannels have conical asymmetric, neck or perforated base morphology, the thinnest diameter of the nanochannels is then oriented on the side of the vessel containing the least concentrated solution of dissolved solutes i.e. in our case vessel B.

Preferably, said nanochannels have a length to mean diameter ratio of less than 1000, in particular less than 100. The length of the nanochannels is also measured by means known to skilled persons e.g. by scanning electron microscopy or transmission electron microscopy.

In one preferred embodiment of the invention, the density of the nanochannels per unit surface area of membrane is higher than $10^5$ nanochannels per $cm^2$ of membrane, in particular higher than $10^8$ nanochannels per $cm^2$ of membrane. The density of the nanochannels per unit surface area of membrane is measured using means known to skilled persons such as scanning electron microscopy or transmission electron microscopy. The higher the density of the nanochannels per unit surface area of membrane the higher the yield of electrical energy generated per unit surface area of membrane.

In one particular embodiment, the vessels A and B of the device of the invention each contain an electrolyte solution (22A and 22B) having a respective concentration $C_A$ and $C_B$ of one same solute, $C_B$ being lower than $C_A$.

By charging the two vessels A and B with electrolyte solutions of different concentrations, an osmotic flow is generated between the two vessels via diffusion-osmosis, without the occurrence of an osmotic pressure. In another embodiment, the concentration gradient could also be obtained via a temperature gradient between the two vessels by acting on the solubility of the salt as a function of temperature.

In the present invention, the concentration ratio Rc (Rc being the ratio of the concentration of the most concentrated solution to the concentration of the least concentrated solution) may be between 1 and $10^9$. Preferably, the concentration ratio $C_A:C_B$ is higher than 1 and equal to or lower than $10^9$, advantageously higher than 10 and equal to or lower than $10^5$.

The electrolyte solutions are aqueous solutions comprising electrolytes. The electrolytes may be of any chemical type insofar as they are dissolved in the solution in the form of charged ions. Preferably, these ions derive from dissolved salts such as NaCl, KCl, $CaCl_2$ and $MgCl_2$. The electrolyte solutions may be synthetic solutions; natural solutions such as fresh water from lakes or rivers, underground waters, brackish waters, seawater; industrial production waters, oil production waters or biological solutions.

Preferably, said electrolyte solutions are aqueous solutions comprising a solute selected from among alkaline halides or alkaline-earth halides, preferably selected from among NaCl, KCl, $CaCl_2$ and $MgCl_2$, more preferably the solute is NaCl.

To improve the osmotic flow generated either side of the membrane with titanium oxide nanochannels, the pH of the solutions is adjusted as a function of the isoelectric point of the inner surface of the nanochannels. To obtain a negative charge on the inner surface of the nanochannels, the pH of the solutions can be adjusted to a value of between ($pH_{iso}+1$) and 14, more favourably between the values ($pH_{iso}+2$) and 12. To obtain a positive charge on the inner surface of the nanochannels, the pH of the solutions can be adjusted to a value of between 0 and ($pH_{iso}-1$) further favourably between 1 and ($pH_{iso}-2$).

In the present invention, by $pH_{iso}$ is meant the pH of the isoelectric point of the constituent material of the inner surface of the nanochannels. $pH_{iso}$ is measured using methods known to skilled persons, in particular with the potentiometric acid-base titration method.

Further favourably, to increase the asymmetry of the device and amplify the quantity of electrical energy produced by the device, a pH gradient may also be set up between the two vessels, the difference in pH between the two solutions will be higher than 1, preferably higher than 2.

Each of the vessels A and B of the device of the invention also comprises an electrode (30A and 30B) arranged so that it comes in contact with the electrolyte solution (22A and 22B). Different types of electrodes can be used to recover the potential or electric current developed between the two vessels. All types of electrodes capable of collecting the flow of $Na^+$ or $Cl^-$ ions can be used, preferably electrodes composed of Silver and Silver Chloride (Ag/AgCl), Carbon and Platinum (C/Pt—), Carbon (C—), Graphite or Iron complexes of the type $[Fe(CN)6]^{4-}/[Fe(CN)6]^{3-}$.

The electrodes can be partly or fully immersed in the electrolyte solutions. Provision could also be made so that the electrodes are in the form of at least one portion of a wall of the vessels. These electrodes are both connected to a device (32) allowing the capture followed by the providing of electrical energy spontaneously generated by the potential difference existing between them. These electrodes are connected in particular via mere cables connecting a battery, a bulb or any other form of electricity consumption.

With the device thus described, it is possible to harvest the electrical energy resulting from the charged ion flow passing through the nanofluid membrane.

In one particular embodiment of the invention, provision could be made so that the device comprises N vessels (20) and N−1 membranes (10), N being an integer in particular of between 3 and 100, more particularly between 3 and 50. In this device, the vessels and membranes are such as defined above. The assembly is therefore formed of alternating vessels alternately containing a concentrated electrolyte solution and a lesser concentrated electrolyte solution, separated from one another by membranes.

In a second aspect, the present invention concerns a method for producing electrical energy using a device such as described above, comprising the following steps:

i. providing a device to produce electrical energy applying the following steps:
placing said electrolyte solution having a concentration $C_A$ of solute (22A) in vessel A (20A), so that the electrode (30A) with which it is equipped is in contact with said solution (22A),
placing said electrolyte solution having a concentration $C_B$ of the same solute (22B), $C_B$ being lower than $C_A$, in vessel B (20B), so that the electrode (30B) with which it is equipped is in contact with said solution (22B), and separating the two vessels A and B by said membrane (10) comprising at least one nanochannel (11) arranged to allow diffusion of the electrolytes from vessel A towards vessel B through said nanochannel(s);

ii. capturing the electrical energy generated by the potential difference existing between the two electrodes, using the device (32).

These different steps can be easily implemented by skilled persons, using their general knowledge.

The following examples are intended to illustrate the present invention.

EXAMPLES

Example 1: Preparation of a Device According to the Invention Comprising a Nanofluid Membrane in Amorphous Titanium Oxide—Measurement of the Electric Current Obtained 1—Preparation of the Nanofluid Membrane in Amorphous Titanium Oxide The nanofluid membrane in amorphous titanium oxide was obtained at 130° C. using the ALD method (Atomic Layer Deposition) by depositing a $TiO_2$ thickness of 5 nm: amorphous titanium oxide was deposited on a nanotubular substrate in nano-melamine comprising a nanochannel and formed of 16 bilayers of $Al_2O_3$ and ZnO on SiN to obtain good adhesion and good surface condition, the surface being previously perforated at the desired diameter of 110 nm.

The membrane thus obtained comprised an amorphous titanium oxide nanochannel having an inner diameter of 100 nanometres and length of 200 nanometres.

The isoelectric point of the membrane was identified at a pH in the order of 6.5.

2—Preparation of the Device of the Invention

This device was formed of two independent vessels each containing a solution of potassium chloride (KCl) dissolved at different concentrations of between 1 mM and 1M, allowing the defining of concentration gradients Rc of 1, 10, 100 and 1000 between the two vessels.

The two vessels were separated by the nanotubular membrane in amorphous titanium oxide obtained at step 1.

Ag/AgCl electrodes were used to measure the electric current produced through the titanium oxide nanotubular membrane.

To conduct measurements of current and conductance, an ammeter and current generator allowing a potential difference to be applied were positioned in series between the two electrodes.

FIG. 3 illustrates this device.

3—Measurements of Osmotic Current, Conductance and Maximum Power Obtained.

Different measurements of osmotic current $I_{osm}$ produced by the membrane and corresponding to the current measured on the ammeter under a potential difference of zero, from which the redox current specific to the two electrodes is subtracted, were conducted with different salinity gradients Rc of 1, 10, 100 and 1000 expressed as a ratio and at pH values of the solution of 9.5, then 10.5 to obtain a high negative surface charge on the surface of the titanium oxide.

The results of these measurements are given in Table 1.

TABLE 1

| | mean $I_{osm}$ of the nanotube, in nA | |
|---|---|---|
| Concentration ratio | mean $I_{osm}$ (nA) at pH = 9.5 | mean $I_{osm}$ (nA) at pH = 10.5 |
| 10 | 0.8 | 1.4 |
| 100 | 1.3 | 1.8 |
| 1000 | 1.7 | 3.3 |

Measurements of conductance G of the membrane were also conducted under the same concentration gradients. These values were obtained by measuring the current I on the ammeter at potential differences ΔV applied following Ohm's law G=I/(ΔV). The values are given in Table 2.

TABLE 2

| | Mean conductance of the nanotube, in nS | |
|---|---|---|
| Concentration ratio | G (nS) at pH = 9.5 | G (nS) at pH = 10.5 |
| 10 | 140 | 200 |
| 100 | 90 | 150 |
| 1000 | 70 | 110 |

The mean maximum power Pmax generated by the nanotube was then calculated using the formula $Pmax=I_{osm}^2/4G$.

On the scale of one square metre of membrane containing $6.9 \times 10^9$ nanochannels per $cm^2$ (D=100 nm, interpores=20 nm), the maximum energy powers produced per $m^2$ for each concentration gradient and pH are extrapolated arithmetically in Table 3.

TABLE 3

| | $Pmax/m^2$ of nanofluid membrane (with density of $6.9 \times 10^9$ nanochannels per $cm^2$) in | |
|---|---|---|
| Concentration ratio | $Pmax/m^2$ (W) at pH = 9.5 | $Pmax/m^2$ (W) at pH = 10.5 |
| 10 | 78 | 169 |
| 100 | 324 | 372 |
| 1000 | 712 | 1707 |

The electric powers, produced per unit surface area with said device using $TiO_2$ nanofluid membranes, exceed the electrical powers produced in the prior art by several orders of magnitude.

Example 2: Preparation of a Device of the Invention Comprising a Nanofluid Membrane in Anatase Titanium Oxide—Measurement of the Electric Current Obtained 1—Preparation of the Nanofluid Membrane in Anatase Titanium Oxide The nanofluid membrane in amorphous titanium oxide was obtained at 130° C. using the ALD method (Atomic Layer Deposition) by depositing a $TiO_2$ thickness of 5 nm: amorphous titanium oxide was deposited on a nanotubular substrate in nano-melamine comprising a nanochannel and formed of 16 bi-layers of $Al_2O_3$ and ZnO on SiN to obtain good adhesion and good surface condition, the surface previously being perforated at the desired diameter of 110 nm.

The membrane obtained was annealed at 500° C. for 2 hours in air to crystallize the titanium oxide to its anatase form.

This membrane comprised a nanochannel in anatase titanium oxide of nanotubular morphology having an inner diameter of 100 nanometres and length of 200 nanometres.

The isoelectric point of the membrane was identified at a pH in the order of 4.

2—Preparation of the Device of the Invention

The device used was similar in every respect to the device in Example 1, using the nanofluid membrane in anatase titanium oxide.

3—Measurements of Osmotic Current, of Conductance and Maximum Power Obtained

Different measurements of osmotic current $I_{osm}$ conducted under the same conditions as in Example 1, corresponding to the current produced by the membrane, were conducted with different salinity gradients Rc of 1, 10, 100 and 1000 expressed as a ratio, and at pH values of the solution of 8 and then 10.5, to obtain a high negative surface charge on the surface of the titanium oxide.

The results of measurements are given in Table 4.

TABLE 4

Mean $I_{osm}$ of the nanotube, in nA

| Concentration ratio | Mean $I_{osm}$ (nA) at pH = 8 | Mean $I_{osm}$ (nA) at pH = 10.5 |
|---|---|---|
| 10 | 1.8 | 2.5 |
| 100 | 3.0 | 4.1 |
| 1000 | 3.7 | 4.0 |

Measurements of conductance G of the membrane are given in Table 5.

TABLE 5

Mean conductance of the nanotube, in nS

| Concentration ratio | G (nS) at pH = 8 | G (nS) at pH = 10.5 |
|---|---|---|
| 10 | 70 | 73 |
| 100 | 50 | 55 |
| 1000 | 45 | 50 |

The mean maximum power Pmax generated by each nanotube was then calculated using the formula $Pmax = I_{osm}^2/4G$. On the scale of one square metre of membrane containing $6.9 \times 10^9$ pores per $cm^2$ (D=100 nm, interpores=20 nm), the maximum energy powers produced per $m^2$ for each concentration gradient and pH are given in Table 6.

TABLE 6

$Pmax/m^2$ of nanofluid membrane, in Watt

| Concentration ratio | $Pmax/m^2$ (W) at pH = 8 | $Pmax/m^2$ (W) at pH = 10.5 |
|---|---|---|
| 10 | 798 | 1476 |
| 100 | 3105 | 5272 |
| 1000 | 5247 | 5520 |

Here again, the measured powers were distinctly higher than in the prior art, and reached values exceeding 5 kW/$m^2$.

By way of comparison, mention is made of the publication by Byeong Dong Kang, Hyun Jung Kim, Moon Gu Lee, Dong-Kwon Kim "Numerical study on energy harvesting from concentration gradient by reverse electrodialysis in anodic alumina nanopores" (Energy vol. 86, 16 May 2015, pages 525-538, ISSN: 0360-5442).

The studies conducted with a membrane comprising alumina nanopores ($Al_2O_3$) report a power of 9.9 W/m2, i.e. lower by more than two orders of magnitude than the electric powers produced in the invention with $TiO_2$ nanofluid membranes.

The invention claimed is:

1. A method for producing electrical energy using a device, comprising the following steps:
    placing an electrolyte solution having a concentration $C_A$ of a solute in a first vessel, the first vessel comprising a first electrode arranged so that the first electrode is contacted with the electrolyte solution of concentration $C_A$,
    placing an electrolyte solution having a concentration $C_B$ of the same solute in a second vessel, the second vessel comprising a second electrode arranged so that the second electrode comes in contact with the electrolyte solution of concentration $C_B$, the concentration $C_B$ being lower than the concentration $C_A$,
    wherein the first vessel and the second vessel are separated by a membrane, the membrane comprising at least one nanochannel arranged to allow diffusion of electrolytes from the first vessel to the second vessel through the at least one nanochannel, at least part of the inner surface of the at least one nanochannel being formed of at least one titanium oxide; and
    capturing electrical energy generated by a potential difference existing between the first and second electrodes using a device comprising the first vessel and the second vessel.

2. The method of claim 1, wherein the electrolyte solutions are aqueous solutions and the solute is selected from among alkaline halides or alkaline-earth halides.

3. The method of claim 2, wherein the solute is selected from the group consisting of NaCl, KCl, $CaCl_2$, and $MgCl_2$.

4. The method of claim 1, wherein a concentration ratio $C_B$:$C_A$ is higher than 1 and equal to or lower than $10^9$.

5. The method of claim 1, wherein a pH of the electrolyte solutions is between ($pH_{iso}$+1) and 14, $pH_{iso}$ being the pH of an isoelectric point of the membrane.

6. The method of claim 1, wherein a pH of the electrolyte solutions is between 0 and ($pH_{iso}$-1), $pH_{iso}$ being the pH of an isoelectric point of the membrane.

7. The method of claim 1, wherein a difference in pH between the two electrolyte solutions contained in the respective first vessel and second vessel is higher than 1.

8. The method of claim 1, wherein the titanium oxide is titanium dioxide ($TiO_2$).

9. The method of claim 1, wherein the titanium oxide is in amorphous form, in anatase crystalline form, in crystalline form of rutile type, or in the form of a mixture of these forms.

10. The method of claim 1, wherein the titanium oxide is crystalline form made of a crystalline network doped by inserting metallic chemical elements or non-metallic elements, or chemical compounds, on the surface or in the core of the crystalline network.

11. The method of claim 1, wherein the at least one nanochannel has a mean diameter of between 1 and 500 nm.

12. The method of claim 1, wherein the at least one nanochannel has a mean diameter of between 10 and 100 nm.

13. The method of claim 1, wherein the at least one nanochannel has a length to mean diameter ratio of less than 1000.

14. The method of claim 1, wherein the membrane comprises a plurality of nanochannels, and wherein a density of the plurality of nanochannels per unit surface area of membrane is higher than $10^5$ nanochannels per cm² of membrane.

15. The method of claim 1, wherein the at least one nanochannel has a nanotubular, conical asymmetric, neck or perforated base morphology.

16. The method of claim 4, wherein the concentration ratio $C_B:C_A$ is higher than 1 and equal to or lower than $10^5$.

17. The method of claim 5, wherein the pH of the electrolyte solutions is between ($pH_{iso+2}$) and 12, $pH_{iso}$ being the pH of the isoelectric point of the membrane.

18. The method of claim 6, wherein the pH of the electrolyte solutions is between 1 and ($pH_{iso}-2$), $pH_{iso}$ being the pH of the isoelectric point of the membrane.

19. The method of claim 7, wherein the difference in pH between the two electrolyte solutions contained in the respective first vessel and second vessel is higher than 2.

20. The method of claim 2, wherein the solute is NaCl.

\* \* \* \* \*